United States Patent [19]

Hamilton

[11] 4,355,240
[45] Oct. 19, 1982

[54] AUXILIARY BACKUP REGULATOR CONTROL FOR PARALLELED CONVERTER CIRCUITS CONTROLLED BY A MASTER REGULATOR

[75] Inventor: Billy H. Hamilton, Summit, N.J.

[73] Assignee: Bell Telephone Laboratories, Incorporated, Murray Hill, N.J.

[21] Appl. No.: 276,052

[22] Filed: Jun. 22, 1981

[51] Int. Cl.³ .......................... H02J 1/10; G05F 1/56
[52] U.S. Cl. ........................................ 307/44; 323/283
[58] Field of Search ................... 307/52, 53, 60, 44, 307/43; 323/267, 282–284

[56] References Cited

U.S. PATENT DOCUMENTS

| | | | |
|---|---|---|---|
| 3,353,083 | 11/1967 | Greenberg et al. | 307/44 X |
| 3,388,312 | 6/1968 | Klein | 323/266 X |
| 3,414,802 | 12/1968 | Harrigan et al. | 307/44 X |
| 3,480,789 | 11/1969 | Binckley et al. | 307/53 |
| 3,504,272 | 3/1970 | Kenney | 307/52 X |
| 3,515,895 | 6/1970 | Bratton | 307/60 X |
| 3,579,090 | 5/1971 | Madsen | 323/284 |
| 4,074,146 | 2/1978 | Buonavita | 307/60 |

OTHER PUBLICATIONS

IEEE Power Electronics Specialist Conference Proceedings, Jun. 1978, Deisch, pp. 300 to 306.

Primary Examiner—Donald A. Griffin
Attorney, Agent, or Firm—A. G. Steinmetz

[57] ABSTRACT

A plurality of current controlled converters coupled in parallel are controlled by a central regulation circuit. Each individual converter includes an auxiliary regulation circuit which is coupled to provide backup regulation if the central regulation circuit fails. The auxiliary regulation circuit has high and low response limits which come into action depending upon whether the central regulation fails in a high or low mode. This permits the converter to remain operative and continue to regulate its output within a predefined backup limit when the central regulation circuit fails.

10 Claims, 4 Drawing Figures

REGULATION CHARACTERISTIC

AUXILIARY BACKUP REGULATOR CONTROL FOR PARALLELED CONVERTER CIRCUITS CONTROLLED BY A MASTER REGULATOR

BACKGROUND OF THE INVENTION

1. Field of the Invention

This invention relates to a method of controlling a plurality of regulated converters or switching regulators operating in parallel and, more particularly, to a system including paralleled converters being controlled by a central regulation circuit and providing protection against a failure of the central regulation circuit while leaving the individual converters fully operative.

2. Description of the Prior Art

Regulated converters, which operate as a current source, may be readily paralleled since they permit load sharing among a plurality of paralleled converters. Paralleling of current source-type converters is discussed in an article by C. W. Deisch entitled "Simple Switching Control Method Changes Power Converter Into A Current Source" published in the IEEE Power Electronics Specialist Conference Proceedings of 1978 pages 300 through 306. Deisch, whose teachings are incorporated herein, discloses a current source-type of converter which has a voltage regulated output. In a current source-type converter with voltage regulation, the output voltage is monitored and compared with a reference voltage to generate an error voltage signal. This error voltage signal is used as the basis for a control voltage. Current flow through the converter switching device is monitored, and a voltage waveform proportional to the detected current is continuously compared with the control voltage derived from the error voltage. The converter switching device is regularly biased conducting by a constant frequency clock. This causes the current to begin increasing with time. When the current voltage waveform equals the control voltage, the switching device is biased nonconducting. The current then begins to decrease until the clock biases the switching device conducting again and the cycle is repeated.

In the paralleled system of converters disclosed by Deisch, a plurality of current source-type converters is connected to a common load. The voltage at that common load is monitored and compared with a reference voltage by a central regulation circuit which generates a voltage error signal. This single error signal is applied in common to each of the paralleled current source-type converters and is used in each individual converter as a regulation control voltage, to control the peak current flowing through the switching device of that converter. It should be noted that the average output current of the converter is approximately equal to the peak current.

It is readily apparent to those skilled in the art that this foregoing scheme of regulation results in the sharing of the load current between the various converters; however, it is just as apparent that the use of a single central voltage regulation control circuit operative to supply a common control voltage to each of the paralleled converters compromises the reliability of the entire power supply system. This is especially important in applications where a separate converter is provided for redundancy purposes to assure high reliability by automatically compensating for a single converter failure. A single failure of the central regulation control circuit causes a failure of the entire system.

SUMMARY OF THE INVENTION

Therefore, in accord with the principles of the invention, a method and circuit apparatus has been devised to enhance the reliability of a plurality of current controlled converters coupled in parallel to a common bus and controlled by a central regulation circuit coupled to regulate the bus voltage. The reliability enhancement is achieved by adding to each individual converter, an auxiliary regulation circuit interactive with the central regulation circuit and coupled to regulate its individual voltage output, if the central regulation circuit fails in either a high or low mode; that is, it permits the output voltage to go low or high but not sufficiently to operate protective voltage limit shutdown circuitry. This auxiliary regulation circuit, located internally to each of the paralleled converter circuits and having high and low response limits, takes over control of the converter output current when the converter output deviates beyond the high-low limits. The net effect is that the auxiliary voltage regulation circuits in the individual converters do not interfere with the operation of the central regulation circuit with the converters in a current-sharing mode as long as the central regulation circuit holds the common output voltage within the high and low limits established by the auxiliary regulation circuits. If, however, the central regulation circuit fails, the auxiliary regulation circuit takes over and protects the integrity of the output voltage of each converter. Under this condition, the converters do not precisely share the total load current. However, with proper adjustment of the auxiliary voltage regulation circuit, all the converters deliver some current to the load and remain fully operative.

The establishment of priority of control between the auxiliary regulation circuit in a particular converter and the central regulation circuit is controlled by a control signal selection circuit which may be embodied in control logic embodied in a properly biased diode switching array located internal to that converter. This control signal selection circuit responds to a failure of the central regulation circuit and applies the appropriate high or low regulation signal generated by the auxiliary regulation control to the converter's switch drive control circuit, in order to regulate the voltage output of the individual converter within an acceptable band of output voltages to permit continued normal operation of the converter.

This method and apparatus of auxiliary regulation described herein provides high system reliability because the power supply system continues to operate, even though the central regulation circuit should fail; and further provides that the auxiliary regulation control signal that achieves control is appropriate in the existing circumstances. Also included in the auxiliary regulation circuit is circuitry providing a simple method of field adjustment of parallel regulators.

BRIEF DESCRIPTION OF THE DRAWING

A complete understanding of the invention may be obtained by studying the following specification in combination with the drawings in which.

DETAILED DESCRIPTION

Figure 1:
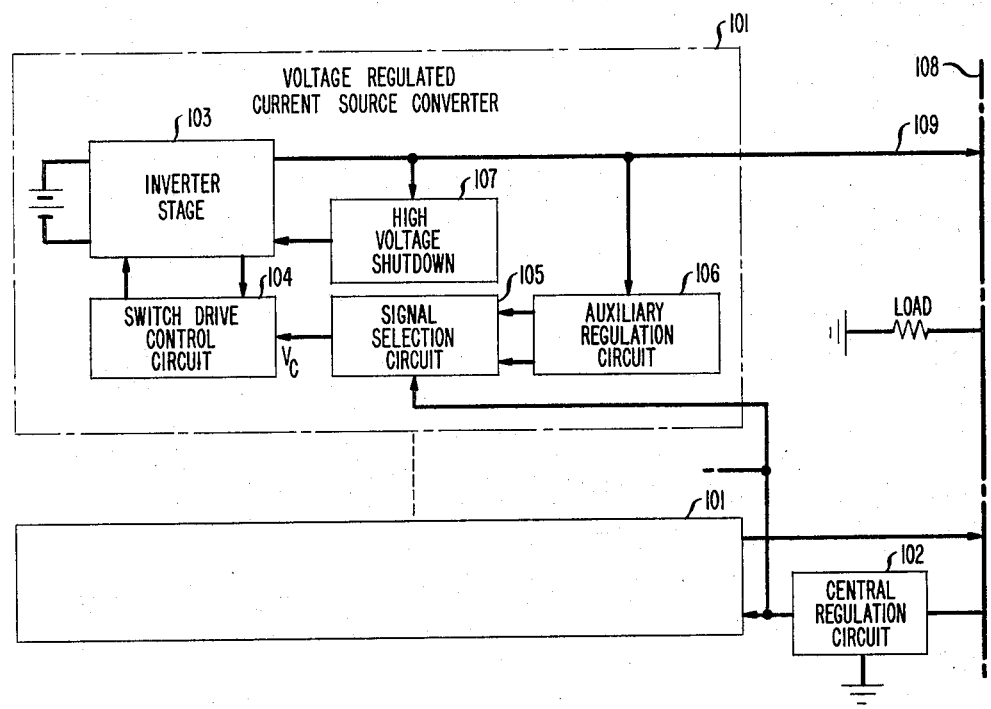
FIG. 1 is a block diagram of a system of paralleled voltage regulated current source-type converters under the control of a central regulation circuit.

FIG. 1 discloses a plurality of voltage regulated current source converters 101 all connected to a common bus 108, in which a central regulation circuit 102, common to a plurality of individual converters 101, is connected to simultaneously voltage regulate all of the parallel connected converter circuits. Each individual converter 101 includes an inverter stage 103, a switch drive control circuit 104, a control signal selection circuit 105 and an auxiliary regulation circuit 106 operative to protect against failure of the central regulation circuit 102. Each converter circuit 101 is operated as a current controlled switching-type voltage regulator in accord with the basic description given hereinabove. The interconnection of the central regulation circuit 102 and the individual converters 101, as illustrated in FIG. 1, is operative as described below to permit each converter circuit 101 to operate independently, should the central regulation circuit 102 fail. The auxiliary regulation circuit 106 in each converter circuit operates to supersede the central regulation circuit and maintains output voltage regulation in each of the converter circuits 101. In this manner, the bus 108 is protected from overvoltage without the necessity to shutdown the converter circuits when the central regulation circuit fails.

Each converter circuit 101 includes an inverter 103 or signal inverting circuit which is current controlled in response to a control voltage $V_C$. The current control voltage $V_C$ is normally supplied by the central regulation circuit 102 which monitors the common load voltage of bus 108, compares it with a reference voltage, and generates a control voltage which is applied through the signal selection circuit 105 to the switch drive control circuit 104. As long as the central regulation circuit is operating and the voltage outputs of individual converters are within well-defined regulation limits, the signal selection circuit 105 continues to forward the control voltage supplied by the central regulation circuit 102 to the control circuit 104. However, should the central regulation circuit 102 fail entirely or fail partially generating control voltages outside a well-defined range of control voltages, the signal selection circuit 105 operates to block the control voltage supplied by the central regulation circuit 102 and substitutes an appropriate control voltage generated by an auxiliary regulation circuit 106 located within each individual converter stage.

Figure 3:
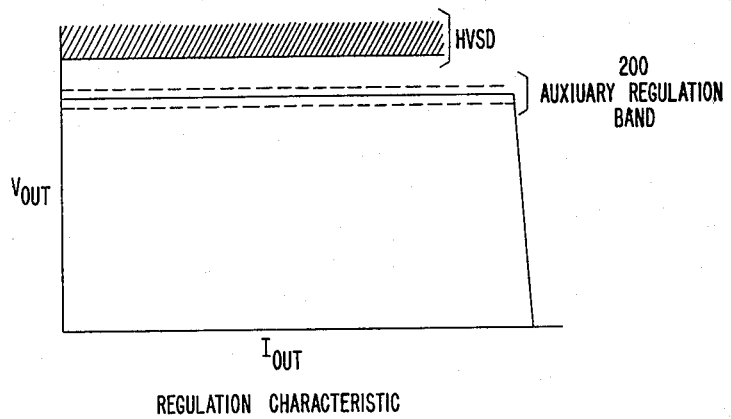
FIG. 3 is the current voltage regulation characteristic of the current source-type converter of FIG. 2.

The auxiliary regulation circuit 106 monitors the individual output voltage of the converter on lead 109 and generates high and low limit control voltages thereby defining a window or regulation band 200 (shown in FIG. 3) within which the central regulation circuit 102 is permitted to operate. If the control voltage supplied by the central regulation circuit 102 exceeds either of these limits, the signal selection circuit 105 disables transmission of that control voltage and substitutes either the high or low limit control voltage depending upon the direction in which the central control voltage causes the regulated output voltage to exceed the limits defined by the window 200 (FIG. 3). Individual converter circuit 101 also includes a high voltage shutdown circuit 107 which in extreme cases upon failure of the central regulation circuit 102 and the auxiliary regulation circuit 106, shuts down the converter 101 to prevent an overvoltage on the bus 108.

Figure 2:
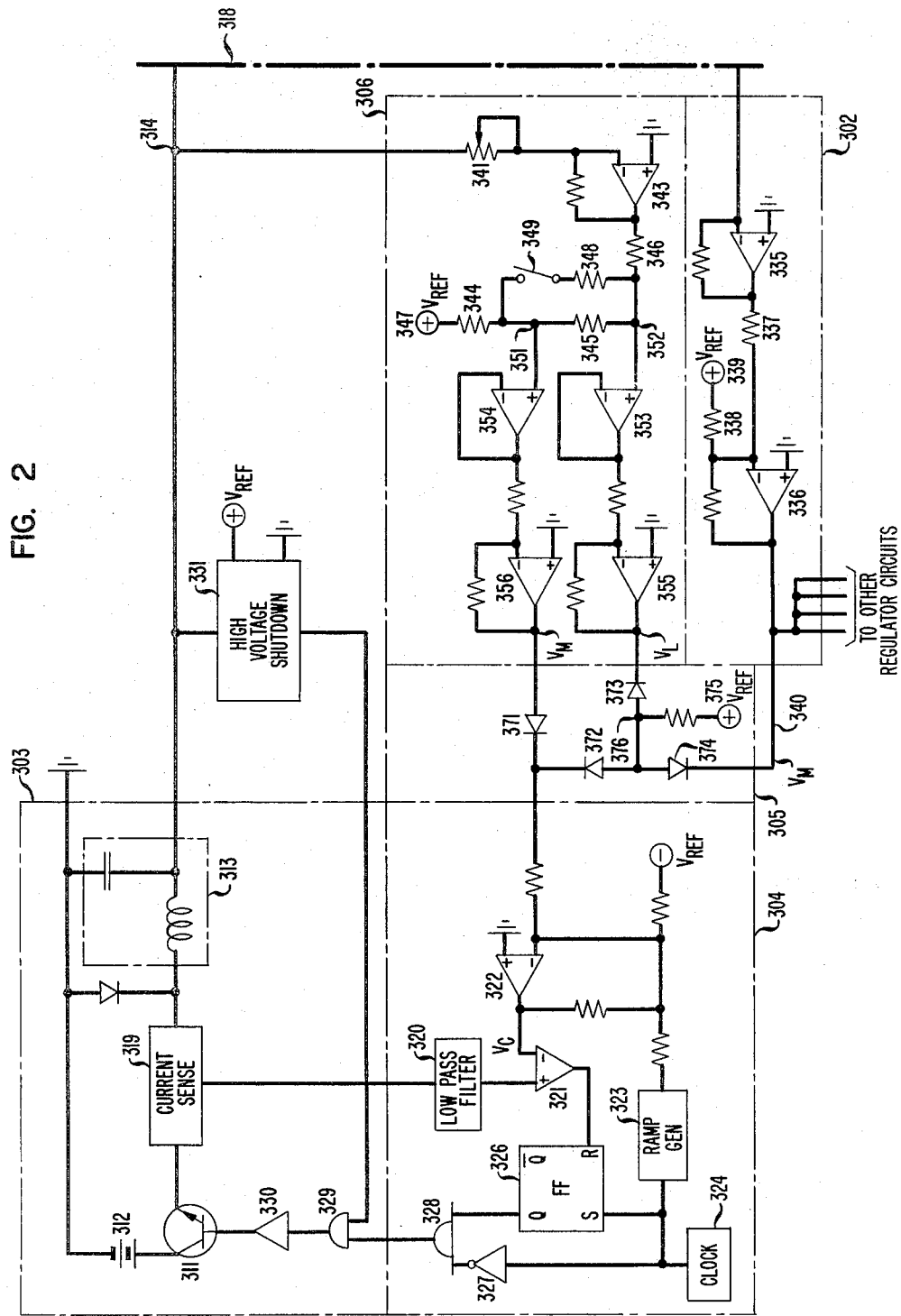
FIG. 2 is a combined block diagram and schematic of one of the paralleled voltage regulated current source-type converters including its regulation control signal selection network and associated auxiliary regulation circuitry.

A detailed block and schematic of a single converter or switching regulator circuit adapted to be connected to a bus in parallel with other regulators and operative to have its output voltage controlled by a central regulation circuit 302 is disclosed in FIG. 2. This regulator circuit includes an auxiliary regulation circuit 306 to prevent a complete shutdown of the regulator, upon failure of the central regulation circuit 302. The inverter stage portion 303 of the voltage regulated supply is embodied as a buck type switching regulator; however, it is to be understood that other types of single-ended and double-ended pulse-width modulated switching circuits can be used with the invention.

A switching transistor 311 is driven to switch on and off periodically. The DC voltage of source 312 is coupled through the switching transistor 311 and an output LC filter 313 to an output terminal 314, which is coupled to a bus 318 to which a plurality of switching-type regulators may be connected in parallel with the switching regulator shown in FIG. 2.

A current sense device 319 is coupled to the emitter of the switching transistor 311 to sense the instantaneous current flow therethrough. The nature of this current waveform in an inverter or regulator circuit is fully described in the aforementioned Deisch reference and hence, is not discussed herein. Current sensing device 319 may be a resistive device, from which a voltage waveform is derived or a magnetic coupling device through which a current waveform is directly derived. The signal waveform representing the sensed current is coupled to a low-pass filter circuit 320 which is included to filter out initial ringing transients which may cause improper triggering in the feedback circuit as described below. A voltage waveform derived from this sensed current waveform, as filtered, is compared by comparator 321 with a control voltage waveform supplied through the signal selection circuit 305 and is used as the primary control of the conduction interval of the switching transistor 311. As discussed hereinabove, this is the peak current control technique wherein, the control voltage waveform is responsive to an error voltage which varies the current threshold at which, the transistor 311 switches in order to control the output voltage of the regulator. The error voltage may be generated by either the central regulation circuit 302 or the auxiliary regulation circuit 306 as discussed below.

For the purposes of operationally describing the switching control of the switching transistor 311, it is assumed that a preliminary control voltage has been derived from an error voltage generated by either regulation circuit and is applied to the inverting input of operational amplifier 322. The noninverting input of operational amplifier 322 is grounded. The preliminary voltage is summed with a negative reference voltage 318 and with a ramp voltage waveform, which is periodically generated by ramp generator 323 in synchronism with the switching into conduction of the switching transistor 311. Ramp generator 323 periodically generates the ramp waveform in response to clock circuit 324, which also controls the frequency of operation of the switching regulator. The summation of the reference voltage, the generated ramp voltage waveform, and the error voltage produces a final control voltage waveform $V_C$ at the output terminal 325 of the operational amplifier 322. The only variable for controlling converter output current to regulate its output voltage in this composite waveform $V_C$ however is the error voltage generated by either the auxiliary regulation circuit or the central regulation circuit.

This control voltage waveform $V_C$ at terminal 325 is applied to the inverting input of comparator amplifier 321. The output of the filter 320 representing a filtered voltage waveform representative of the instantaneous current waveform sensed by the current sensing device 319 is applied to the noninverting input of the comparator 321. When the magnitude of the voltage waveform output of filter 320 exceeds the magnitude of the control voltage waveform, the output of the comparator 321 changes state. This output state is applied to reset a flip-flop 326.

Conduction in the switching transistor 311 is initiated in each cycle of operation in response to the periodic pulse output of clock 324. This pulse output is inverted by a polarity inverter 327 and applied to an AND gate 328. Signal transmission through AND gate 328 is enabled by the set Q output of flip-flop 326. Flip-flop 326 is set in response to the pulse output of the clock 324. The output of the enabled AND gate 328 is applied via a second AND gate 329 and drive amplifier 330 to the control electrode of the switching transistor 311 and is operative to bias it into a saturated conduction state.

AND gate 329 is continuously enabled by the control signal output of a high voltage shutdown circuit 331. The high voltage shutdown circuit 331 is coupled to sense the voltage output of the regulator. It compares this voltage with a shutdown voltage reference and generates a shutdown signal to disable gate 329 if a high overvoltage condition exists, and hence immediately terminates all conduction in the switching transistor 311.

The periodically initiated conduction interval of the switching transistor 311 continues until the voltage waveform representing current begins to exceed the control voltage waveform. At this point, the flip-flop 326 is reset by the output of the comparator 321, the AND gate 328 is disabled and the drive pulse is thereby removed from the switching transistor 311 biasing it nonconductive. During normal operation when the central regulation circuit 302 supplies the variable DC error component of the control voltage $V_C$, the output voltage of the switching regulator is approximately centered within a normal operating range 200 (as shown in FIG. 3) having upper and lower limits established by the auxiliary regulation circuit included within the switching regulator. In this mode of operation, the error voltage component of the control voltage applied to the operational amplifier 322 is generated by the central regulation circuit 302 and is processed through the signal selection network 305 to be applied to the inverting input of the operational amplifier 322, which in turn, is utilized to generate the final control voltage waveform $V_C$.

The central regulation circuit 302 includes an operational amplifier 335 having its noninverting input grounded, and its inverting input coupled to monitor the voltage of the bus 318 whose voltage is to be monitored. Amplifier 335 inverts the polarity of the sensed bus voltage and multiplies it by a fixed gain. This amplified voltage is applied to a level shifting amplifier 336 having its noninverted input grounded and its inverting input coupled to receive the output of the previous operational amplifier 335 via a voltage divider comprising resistors 337 and 338 and a reference voltage source 339.

This second operational amplifier 336 has a fixed gain, inverts the input signal and supplies an error signal responsive to deviations of the bus voltage from a desired voltage level. This error signal is coupled as a preliminary control voltage in parallel to all the switching regulator circuits coupled in parallel to the bus 318. It is coupled, via lead 340, to the signal selection circuit 305 of the switching regulator shown in FIG. 2. The coupling of this error signal or preliminary control voltage to the control circuit 304 of the switching regulator in FIG. 2 is described below when the signal selection circuit 305 is discussed.

The individual voltage output of the switching regulator is sensed at output node 314 and coupled to the auxiliary regulation circuit 306. This voltage is applied through a potentiometer 341 to the inverting input of a controlled gain amplifier 343 included therein. Its output is coupled to one end of a voltage divider comprising three resistors 344, 345 and 346. A positive reference voltage 347 is coupled to resistor 344. The nodes 351, 352 between the resistors 344, 345 and resistors 345, 346, respectively define two different voltage levels, which are spaced-apart from each other by a value, which determines the width of the window 200 (see FIG. 3) established by the auxiliary regulation control 306.

It is noted that an additional resistor 348, connected in series with a switch 349, is shunted across the center resistor 345 of the voltage divider. This resistor 349 is smaller in value than resistor 345 and is included as described below to permit adjustment of the regulation window 200 (see FIG. 3) when initial circuit adjustments are made or calibrated.

It is apparent from the foregoing description that the application of a reference voltage 347 to one end of the voltage divider and an application of a voltage proportional to the output voltage to the other end, causes the voltage levels at the nodes 351, 352 of the voltage divider to shift up and down in unison and at a fixed voltage difference between them in response to voltage changes at output node 314. These voltage signals at nodes 352 and 351 are coupled by isolating amplifiers 353, 354 to the controlled gain amplifiers 355, 356, respectively. The outputs of amplifiers 355, 356 represent lower and upper limit error signals, respectively.

Accordingly, it is apparent, that the auxiliary regulation control 306, in combination with the central regulation control 302, supplies to the signal selection circuit 305 three different amplified error signals or preliminary control voltages. The auxiliary regulation control supplies an upper and lower limit error signal whereas, the central regulation control supplies an error signal somewhere within the band defined by the upper and lower limits of the error signals of the auxiliary regulation control 306.

The signal selection circuit 305 responds to the three input error signals and establishes appropriate control priorities to determine which error signal is applied to the amplifier 322 to control the switching of transistor 311. It is noted that should the error signal on lead 340, from the central regulator fail in either direction, high or low, the appropriate error signal from amplifier 356 or 355 will take over control of the input to amplifier 322. It is this input that controls the converter output current; hence the error signal generated by the remaining functioning error signal source will actively control the regulation of the switching regulator.

The signal selection circuit 305 which exerts this selective control is embodied in a diode array biased by a preset bias voltage. This diode array selects the control voltages that will be transmitted, from either of the three error signal generating amplifiers to amplifier 322 in order to control and regulate the switching regulator. These diodes include a high error voltage pass diode 371, a low error voltage pass diode 373, and first and second central error voltage pass diodes 374,372. All are coupled to the output of either the high or low amplifier output of the auxiliary regulation circuit 306 or the output of the central regulation circuit 302 and have outputs coupled in common to amplifier 322 of the control circuit of the switching regulator.

A suitable approach to understanding the operation of the signal selection circuit 305 is to take each operative situation contemplated for the switching regulator and discuss the operation of the various control and signal selection circuits in response thereto.

During normal operation the output voltage of the voltage regulator is normally centered within the voltage band range or window 200 as shown in FIG. 3. The central regulation circuit 302 continuously monitors the bus voltage and generates an error voltage $V_M$. This error voltage during normal operation has a magnitude that when applied to the switching regulator control circuit 304 is operative to hold the output voltage for that particular regulator within the desired voltage range 200 shown in FIG. 3. This error voltage $V_M$ is applied via lead 340 to diode 374 of the combining network 305. Simultaneously, amplifier 356 of the auxiliary regulation control 306 applies a high level error voltage $V_H$ to the anode of diode 371. The second amplifier 355 applies a low level error voltage $V_L$ to the cathode of diode 373.

These error voltages are all referenced by the signal selection circuit 305 with respect to a fixed bias voltage 375 which is applied to a node 376 common to the anode of diodes 372,373 and 374. In this normal mode of operation, the error voltage output level of the central regulation circuit 302 is at a value in between the error voltages established by the high and low error voltage outputs of the auxiliary regulation circuit 306 which establishes the normal band of operation. Accordingly, it is apparent that diodes 373,371 are both reversed-biased and are nonconducting. Hence, both high limit and low limit error voltages generated by the auxiliary regulation circuit 306 are prevented from being transmitted to the control circuit 304 and exerting regulatory control over the switching regulator. The error voltage output $V_M$ of the central regulation circuit 302 is transmitted via forward-biased diode 374 and forward-biased diode 372 to the control circuit 304. This error voltage $V_M$ subjects the switching regulator to the control of the central regulation circuit 302 and assures that all of the operative switching regulators connected to the bus operate in a current sharing mode.

A second control situation occurs when the central regulation circuit 302 fails in such a fashion that the error voltage it generates would cause the output voltage of the switching regulator to be drive high, that is, exceed the upper limit of the voltage band 200 in FIG. 3. In this situation, the error voltage generated by the central regulation circuit 302 goes low. This error signal $V_M(-)$ is applied to diode 374 of the combining network 305. The preselected bias voltage 375 appearing at common node 376 is at a level such that the diode 372 is reversed-biased in this condition of operation. Hence, neither the low level error signal $V_L$ applied by amplifier 355 nor the central error signal $V_M(-)$ generated by the central regulation control can be applied to amplifier 322 of the control circuit of the switching regulator. In this mode of operation, the high level error signal $V_H$ supplied by the high error voltage amplifier 356 is transmitted by forward-biased diode 376 to amplifier 322 and assumes active control to prevent the failure of the central regulator from driving the bus voltage to a high level outside the band limit 200 (FIG. 3).

A second failure mode occurs when the central regulation circuit 302 fails low, that is, it fails in such a way to cause the output voltage of the switching regulator to go below the limits of the voltage band 200. In such a situation, the error voltage $V_M(+)$ generated by the central regulation control 302 is higher than its normal value. In this condition with the central regulation generated error signal $V_M(+)$, the diode 374 is back-biased and the centrally generated error signal $V_M(+)$ is not transmitted through the signal selection circuit 305. Due to the bias voltage 375, the low pass diode 373 is forward-biased and the diode 374 is also forward-biased. Because the low level error signal $V_L$ generated by the auxiliary regulation control 306 is lower than the high level signal $V_H$, the diode 371 is also reversed-biased and hence, only the low level error signal $V_L$ is transmitted via diode 373 and diode 374 to amplifier 322 of the control circuit where it becomes the controlling error voltage signal to control or voltage regulate the switching regulator.

As discussed above, the auxiliary regulation control 306 includes a shunt switch 349 and shunt resistor 348 connected to the voltage divider circuit to reduce the width of the voltage band 200 to permit initial adjustment of the output voltage of the converters. By closing the switch, the difference in the two error voltage levels of the auxiliary regulation control is reduced. This circuitry permits the centering of the central regulator voltage within the voltage band 200. This switch 349 is then opened for normal operation allowing variations in the regulated voltage without activating the auxiliary regulation control. By manipulation of the value of resistor 344, with switch 349 closed, the voltage band 200 may be shifted up and down to center it about any desired central error voltage that the central regulator establishes.

It is apparent from the foregoing description of the operation of the voltage regulator that the central regulation control normally controls the voltage regulation of each switching regulator. Should the central regulation control malfunction, shutdown is prevented by the action of the auxiliary regulation control, which allows individual regulators to continue to operate normally at some voltage output higher or slightly lower than the optimum output voltage and to continue to supply power to the bus.

Figure 4:
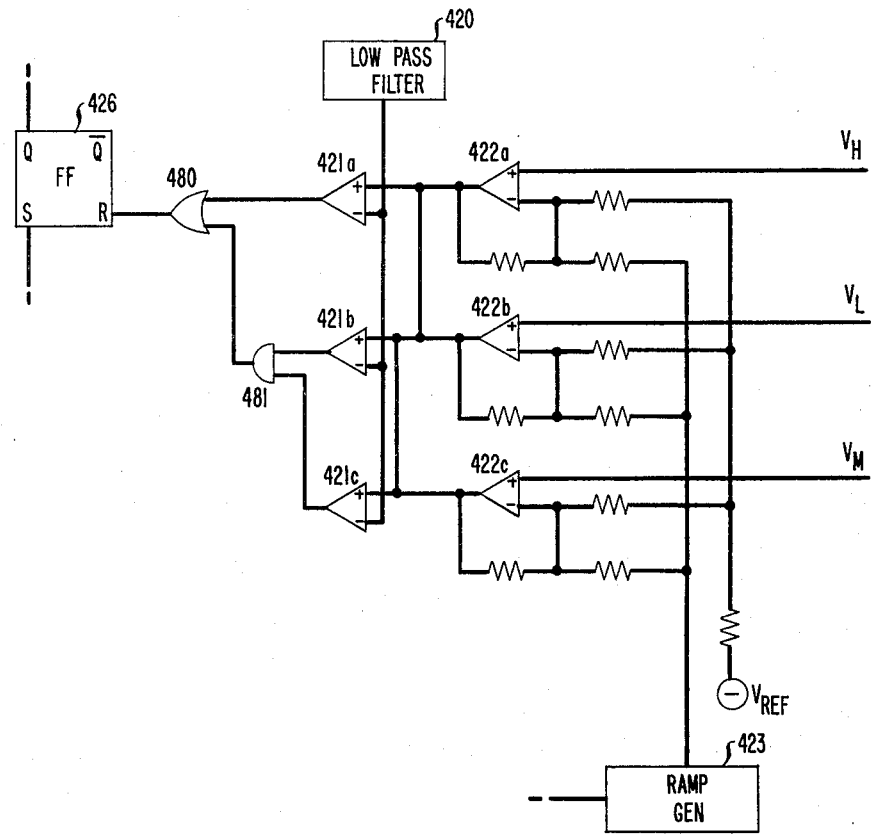
FIG. 4 is a schematic of a modification of part of the circuit of FIG. 2 showing an alternative embodiment of part of the regulation circuitry.

An alternative signal selection arrangement utilizing digital logic circuitry is shown in FIG. 4. In this arrangement, each of the error signals $V_H$, $V_L$ and $V_M$ are applied to three amplifiers 422a, 422b and 422c which correspond to and replace amplifier 322 in FIG. 2. Each of these amplifiers 422a, 422b and 422c have the ramp signal and reference signals as inputs along the appropriate error signal. Their outputs are applied to comparators 421a, 421b and 421c, respectively where the amplitude is compared to the current waveform output of low pass filter 420. The outputs of comparators 421b and 421c are applied to AND gate 481. The outputs of comparators 421a and AND gate 481 are applied to OR gate 480 whose output, in turn, is used to reset flip-flop 426 and terminate conduction in the switching transistor.

It is readily apparent that during normal operation that the output of comparator 421c will be high before the output of comparator 421b is high. When the output of comparator 421b goes high, AND gate 481 is enabled and its output is applied through OR gate 480 to reset flip-flop 426. If the error voltage $V_M$ goes low, AND gate 481 will not be enabled and the output of comparator 421a responsive to error voltage, $V_H$, will supply the reset signal to flip-flop 426 through OR gate 480. Alternatively if error voltage $V_M$ goes high, AND gate 481 will be enabled in response to the output of comparator 421b responsive to the error voltage $V_L$.

Many other varied approaches of this type of voltage regulation may be constructed to achieve the objectives of the invention without departing from the spirit and scope thereof.

What is claimed is:

1. A power supply system comprising;
   a central regulation circuit which senses a bus voltage and supplies a first error voltage to a plurality of converters coupled to the bus,
   at least one of the converters including an auxiliary regulation circuit which senses an output voltage of that converter and establishes an error voltage band including a high level and low level error voltage which establishes limits within which the first error voltage is operative,
   switch control circuitry for pulse-width modulating a switching device in the first converter in response to an error voltage, and
   a signal selection circuitry interconnecting the central regulation circuit and the auxiliary regulation circuit to the switch control circuitry and operative for selectively applying one of said first, high and low error voltages to the switch control circuitry in response to relative magnitudes of the first, high and low error voltages.

2. A power supply system as defined in claim 1 wherein said auxiliary regulation circuit comprises;
   a voltage divider including,
   means for accepting a reference voltage connected to one end of the voltage divider,
   means for sensing an individual output voltage of a converter and generating a proportional signal connected to an end opposite the one end of the voltage divider, and
   means for generating the high level and low level error voltages and coupled to intermediate tap off points of the voltage divider from which the high and low error voltages are derived.

3. A power supply system as defined in claim 2 wherein said signal selection circuitry comprises;
   first, second and third input terminals for accepting the first error voltage, the high level error voltage and the low level error voltage respectively,
   an output terminal connected to the switch control circuit, and
   a bias terminal to accept a bias voltage; first, second, third and fourth diodes each having an anode and cathode terminal, the first diode having its anode coupled to the second terminal and its cathode coupled to the output terminal; the second diode having its cathode coupled to the third terminal and its anode coupled to a junction common to anodes of the third and fourth diodes and to the bias terminal; and the third and fourth diodes having their anodes connected to the common junction, the cathode of the third diode being connected to the first terminal and the cathode of the fourth diode being coupled to the output terminal.

4. A power supply system comprising at least a first and second current controlled converter coupled to a common bus, each converter including drive circuitry to pulse-width modulate switching devices in the converter in response to an error signal applied thereto,
   a central regulation control coupled to sense a voltage of the bus and generate a central error signal in response to deviations of the voltage of the bus from a desired value,
   an auxiliary regulation control included in each converter coupled to sense an output voltage of that converter and generating a high level error signal and a low level error signal in response to deviations of the output voltage of the converter from a desired value,
   the high level error signal being greater in amplitude than the central error signal and the low level error signal being less in amplitude than the central error signal, defining a voltage band enclosing the central error voltage,
   an error signal coupling network including a plurality of transmission paths coupling the central, high level and low level error signals to the drive circuitry, the transmission paths including unidirectional conduction means, a bias voltage source to supply a bias voltage level to the unidirectional conduction means, whereby the respective amplitudes of the central, high level and low level error signals and the bias voltage enables a unique transmission path so that one and only one error voltage is applied to the drive circuitry.

5. A power supply system as defined in claim 4 wherein the unidirectional conduction means includes first, second, third and fourth diodes, and the transmission paths include first, second and third pathways to couple the central high level and low level error signals to the drive circuitry, the second pathway comprising the first diode; the third pathway comprising the second and third diodes; and the first pathway comprising the third and fourth diodes.

6. A power supply system as defined in claim 4 wherein the auxiliary regulation control includes a voltage divider having one end terminal coupled to a reference voltage and another end opposite the one end coupled to an output voltage of a converter and first and second intermediate nodes from which a high level and low level error signal is derived.

7. A power supply system as defined in claim 6 wherein the regulation control further includes means for shunting the first and second intermediate nodes with a resistor in order to lower the total impedance therebetween to permit circuit calibration.

8. In a power supply system comprising at least a first and second current controlled converter having outputs coupled to a common bus and a central regulation control to monitor a bus voltage and generate a central error signal to apply to first and second switching device control circuits in said first and second converters wherein the improvement comprises;

an auxiliary regulation control included in at least said first current controlled converter and comprising means for monitoring an individual output voltage of said first current controlled converter, means for generating a high level error signal in response to said means for monitoring, means for generating a low level error signal in response to said means for monitoring, gating circuitry for coupling the central error signal, the high level error signal and the low level error signal to the first switching device control circuit, the gating circuitry including signal amplitude dependent transmission paths dependent upon the amplitude of the master error signal with respect to the upper and lower threshold value and transmitting the high level or low level error signal whenever the master error signal exceeds the upper or lower threshold level.

9. A power supply system as defined in claim 8 wherein said means for monitoring an individual output voltage include a voltage divider comprising first and second end terminals and a series connection of at least a first, second and third resistor; the first end terminal connected to a reference voltage; the second end terminal coupled to an output voltage of the converter; first means for deriving a high level error signal from a voltage at a node joining the first and second resistors, and a second means for deriving a low level error signal from a voltage at a node joining the second and third resistors.

10. A power supply as defined in claim 8 wherein said gating circuitry includes diodes and a bias voltage source wherein a voltage level of the central error signal relative to the bias voltage determines an enabling of a transmission path.

* * * * *